(12) United States Patent
Kubby

(10) Patent No.: US 6,507,001 B1
(45) Date of Patent: Jan. 14, 2003

(54) NOZZLES FOR INK JET DEVICES AND LASER ABLATING OR PRECISION INJECTION MOLDING METHODS FOR MICROFABRICATION OF THE NOZZLES

(75) Inventor: Joel A. Kubby, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/232,456

(22) Filed: Jan. 19, 1999

(51) Int. Cl.[7] ............................................... B23K 26/38
(52) U.S. Cl. .................................................. 219/121.71
(58) Field of Search ....................... 219/121.67, 121.68, 219/121.69, 121.7, 121.71, 121.72

(56) References Cited

U.S. PATENT DOCUMENTS

| | | | |
|---|---|---|---|
| 4,413,268 A | * 11/1983 | Bentin | 347/47 |
| 4,961,821 A | 10/1990 | Drake et al. | |
| 4,975,143 A | 12/1990 | Drake et al. | |
| 4,985,710 A | 1/1991 | Drake et al. | |
| 5,045,142 A | 9/1991 | Drake et al. | |
| 5,206,983 A | 5/1993 | Guckel et al. | |
| 5,487,483 A | * 1/1996 | Kubby | 216/27 |
| 5,588,597 A | 12/1996 | Reinecke et al. | |
| 5,809,646 A | 9/1998 | Reinecke et al. | |
| 5,818,479 A | 10/1998 | Reinecke et al. | |
| 6,130,009 A | * 10/2000 | Smith et al. | 219/121.7 |
| 6,132,028 A | * 10/2000 | Su et al. | 347/47 |

OTHER PUBLICATIONS

Doring, M., "Ink–Jet Printing," Phillips Tech. Rev. 40, No. 7, 1982, pp. 192–198.

* cited by examiner

Primary Examiner—Samuel M. Heinrich
(74) Attorney, Agent, or Firm—Oliff & Berridge, PLC

(57) ABSTRACT

An ink jet nozzle is made from a microfabrication technique including either laser ablation or precision injection molding. The laser ablation method includes ablating an upper surface of a nozzle plate to create a bore, optionally placing a photomask adjacent to the lower surface and over the bore, and laser ablating the lower surface of the nozzle plate to create a lip which extends away from the lower surface of the nozzle plate. The lip can prevent unwanted and/or asymmetrical deflection of ink droplets. Also, the nozzle can be made from plastics, polymers or ceramics, which are resistant to acidic or basic inks, which may cause deterioration of single silicon wafers or semiconductor materials. The precision injection molding microfabrication process includes providing upper and lower molds with a space therebetween, injecting the space with the molding material, and removing the upper and lower molds to release the thus formed ink jet nozzle. Using either method, ink jet nozzles can be made using new materials beyond the silicon or semiconductor materials, and a broader range of inks may be used as well. The structure of the ink jet nozzle includes a nozzle plate having upper and lower surfaces, a lip formed in one piece with the nozzle plate and extending away from the lower surface thereof, and a bore extending from the upper surface to the lower surface of the nozzle plate and completely through the lip. The bore has an interior surface inclined at an angle respective to the upper and lower surfaces, the angle being substantially constant throughout a thickness of the nozzle plate and the lid. A lower surface of the lid forms an acute angle with the interior surface of the bore to thereby enhance the anti-wetting quality of the nozzle.

6 Claims, 4 Drawing Sheets

NOZZLES FOR INK JET DEVICES AND LASER ABLATING OR PRECISION INJECTION MOLDING METHODS FOR MICROFABRICATION OF THE NOZZLES

BACKGROUND OF THE INVENTION

1. Field of Invention

This invention relates to anti-wetting ink jet nozzles and a method of precisely forming anti-wetting ink jet nozzles. One method uses laser ablation and another method uses precision injection molding to create a nozzle with a lip that can prevent unwanted deflection of ink droplets. The ink jet nozzles can be made from materials that avoid damage from inks which have been known to cause damage to nozzles made from silicon wafers or semiconductors. Moreover, the invention enables a wider range of inks, e.g., abrasive or aggressive inks in the upper and lower pH ranges, for use with ink jet nozzles.

2. Description of Related Art

FIG. 1A shows a prior art ink jet printing device 1 having a conventional nozzle structure that includes an annular bore 3 and a front face 4 that is oriented perpendicular to the axis of the bore 3. Each bore 3 of an ink jetting device 1 is supplied with a supply of ink 2 that is intended to create characters on a recording medium (not shown). FIG. 1A shows the progression of ink 2 as it emerges from the bore 3 and eventually onto a recording medium. The formation of a droplet 5 eventually occurs at the mouth of the bore and gradually builds in size until the ink emerges from the bore and prints the desired character on the recording medium. Thermal ink jet devices of this type suffer in print quality when wetting 6 occurs on the front face 4 of the ink jet nozzle. This type of wetting creates imprecise character printing and often times smudging.

In addition, when a portion 7 of the ink 2 surrounding the orifice 3 dries in an asymmetrical manner as shown in FIG. 1B, a next forming droplet 8 is cohesively attracted to the side where the wetting is greatest and deflected in that direction as indicated by arrow 9. Prior art thermal ink jet devices use a hydrophobic front face coating to minimize front face wetting by the ink in an attempt to avoid these directionality problems.

Another solution is to minimize wetting by microfabricating a nozzle structure surrounding the orifice that minimizes front face wetting. Such a solution to the ink wetting problem is shown in prior art FIG. 2 which shows an ink jet nozzle 10 having a front face 11 perpendicular to a bore 12 forming a passage for ink 13 to be supplied from an unshown source. In addition, the nozzle 10 of FIG. 2 includes a lip portion 14 that serves to prevent wetting on the front face 11 of the nozzle. While this nozzle structure helps to eliminate wetting, it suffers because it is currently manufactured by expensive chemical or mechanical processes.

FIG. 3 shows a five-step chemical process by which a lip portion of the prior art device of FIG. 2 is formed. The first step is to provide a brass plate 15 as shown in step (a) and to drill a first cylindrical hole 16 and a second countersunk bore 17 within the brass plate 15 (step (b)). In step (c), a layer of nickel 18 is applied by the "electroless" method to all surfaces of brass plate 15 of step (b) including top face 19, bottom face 20, and the surfaces of throughhole 16 and countersunk hole 17. In step (d), the bottom surface 21 of the nickel layer 18 and some of the brass, where necessary, are removed by grinding. Finally, in step (e), the surface 20 surrounding the nickel surface 18b coated onto annular bore 16 is selectively etched to produce a lip portion 14 of the nozzle.

FIGS. 4A and 4B show an alternative method for mechanically forming a lip portion on an ink jet nozzle. In this process, the object is to punch a hole using punch 22 in a nickel plate 23, the nickel plate forming the nozzle. A force F drives the punch 22 into the nickel plate 23. At the end of the process, a part of the nickel plate 23 will penetrate into a plastic strip 24. Because of the supporting action of steel plate 25 and the fluid behavior of plastic 24, a hole 26 without burrs and of the desired shape including a lip 27 is produced in the nickel plate 23.

It is also known to produce nozzle plates using a laser ablation technique, whereby a laser is used to create a bore, e.g., a countersunk bore, through the nozzle plate. However, such nozzles also suffer from the ink wetting problems described above because they do not have a lip portion, as shown in FIG. 2.

U.S. Pat. No. 4,961,821 to Drake et al. discloses a method for forming throughholes in silicon wafers using an orientation dependent etching technique, and is incorporated herein by reference. As shown in FIGS. 9E and 9F of Drake, however, the ink jet nozzles encounter the same problems as those discussed in reference to FIGS. 1A and 1B. Moreover, the orifices of Drake do not provide for a lip portion that prevents wetting around the area surrounding the ink jetting orifice. In addition, the method for manufacturing the orifice includes an anisotropic method of etching that requires surfaces 31 and 32 to be covered with an etch resistant layer 34 in those areas where it is not desired to form a throughhole. Moreover, Drake anisotropically etches (100) crystallographic planes 35 and 36 using an additional etch resistant layer 34 to mask those portions of the wafer 30 not desired to be etched.

U.S. Pat. No. 5,487,483 to Kubby, incorporated herein by reference, discloses an ink jet nozzle and a method for manufacturing the same. A hollow extension lip is provided to prevent unwanted deflection of ink droplets. The nozzle as well as the hollow extension lip are disclosed as being made, for example, using a two step process including physical sputter erosion and chemically etching the nozzle area surrounding the orifice using an anisotropic etching method. However, this process is limited for use with silicon wafers or other semiconductor materials. Also, silicon/semiconductors are limited because acidic or basic inks can cause damage to those materials, and thus the selection of inks for use in ink jet nozzles using such materials is limited.

SUMMARY OF THE INVENTION

It is an aspect of the present invention to provide an anti-wetting ink jet nozzle for a printing device that prevents unwanted deflection of ink droplets by preventing asymmetrical depositing of ink about the regions surrounding the orifice of the ink jet nozzle.

It is another aspect of the present invention to expand the materials available for producing anti-wetting, precision ink jetting nozzles. For example, the manufacturing processing techniques can be used to create nozzles made, for example, of polymers (e.g., polysulphone), plastics, Teflon®, metals and/or oxides, etc.

It is another aspect to form the nozzles of the ink jetting devices in a cost-efficient and time-efficient manner, and which can eliminate the problems associated with ink selection limitations and ink history defects. Thus, more chemically aggressive inks can be used, e.g., inks having a pH of 3 or 9–10.

According to one aspect of the invention, there is provided a method of microfabrication of an ink jet nozzle. The method comprises the steps of providing a nozzle plate having an upper surface and a lower surface; laser ablating the upper surface of the nozzle plate to create a bore which extends from the upper surface of the nozzle plate to the lower surface of the nozzle plate; and laser ablating the lower surface of the nozzle plate to create a lip which extends away from the lower surface of the nozzle plate.

According to another aspect of the present invention, there is provided a method of microfabrication of an ink jet nozzle. The method comprises the steps of providing upper and lower molds forming therebetween a space defining a shape corresponding to an ink jet nozzle having a nozzle plate and a lip formed in one piece with an extending away from the nozzle plate; injecting the space with a molding material; and removing the upper and lower molds to release the thus formed ink jet nozzle. In this method, the molding material may be a polymer, a plastic material, ceramics, or any material that can be injection molded. In addition, the method may further comprise forming the lip of an ink jet nozzle using a nozzle forming pin which may be formed in the upper mold. In addition, the pin may be movable with respect to both the upper and lower molds to enable manufacturing nozzle plates and corresponding lips with different shapes and characteristics.

In accordance with another aspect of the present invention, there is provided an ink jet nozzle comprising a nozzle plate having an upper surface and a lower surface; a lip formed in one piece with the nozzle plate and extending away from the lower surface thereof; and a bore extending from the upper surface to the lower surface of the nozzle plate and completely through the lip. The bore has an interior surface inclined at an angle with respect to the upper and lower surfaces, the angle being substantially constant throughout the nozzle plate and the lip.

In embodiments, a cross sectional shape of the lip may be trapezoidal, a lower surface of the lip may form an acute angle with the interior surface of the bore, the nozzle plate and lip may be made from a material resistant to ink latitude limitations an ink history defects, and/or the material may be a plastic and/or polymer.

These and other aspects of the present invention will become apparent from or described in the following detailed description of preferred embodiments.

BRIEF DESCRIPTION OF THE DRAWINGS

Preferred embodiments of the invention will be described in detail with reference to the following drawings in which like reference numerals refer to like elements, and wherein.

DETAILED DESCRIPTION OF PREFERRED EMBODIMENTS

A first embodiment of the present invention will be described with reference to FIGS. 5A–5D, and a second embodiment of the invention will be described with reference to FIGS. 6A–6C.

Figure 1A:
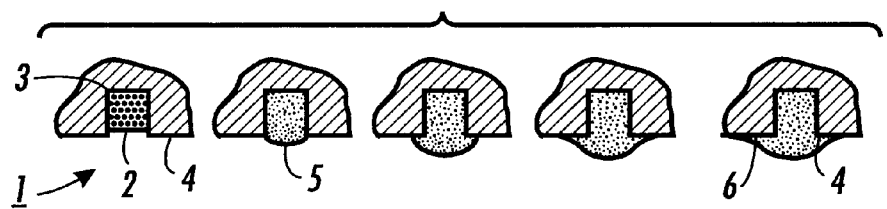
FIGS. 1A and 1B show a prior art nozzle that suffers from wetting in the region of the orifice.
Figure 1B:
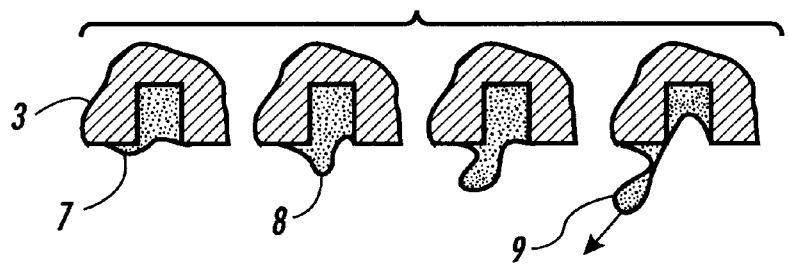
Figure 2:
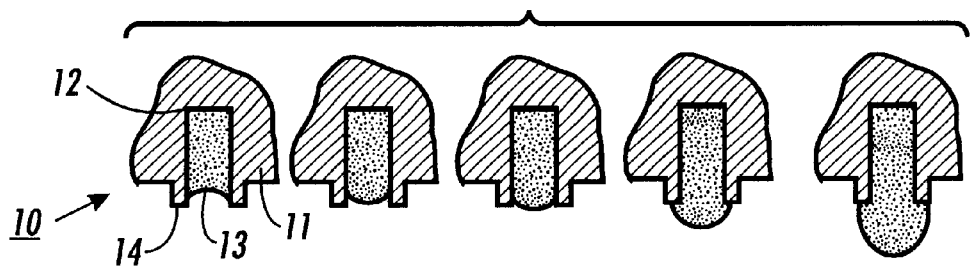
FIG. 2 shows a prior art nozzle having a cylindrical lip portion.
Figure 3:
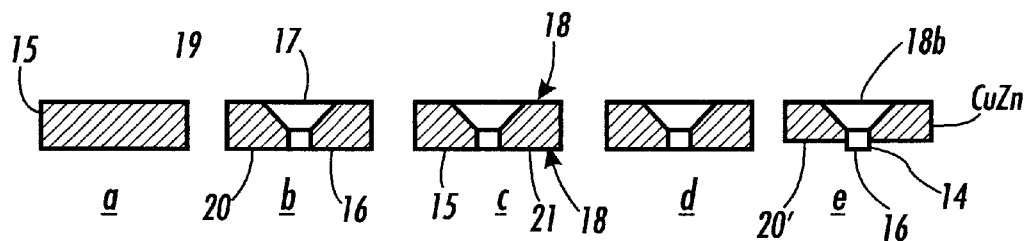
FIG. 3 shows a prior art chemical method of forming a lip portion of FIG. 2.
Figure 4A:
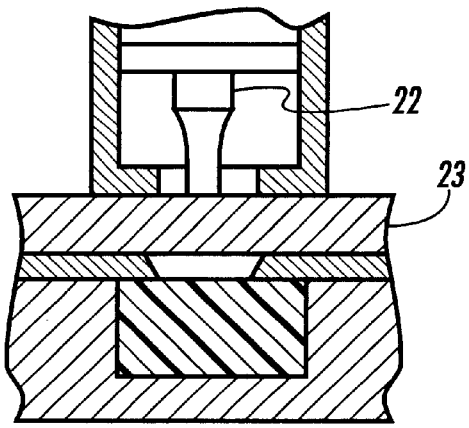
FIG. 4A and 4B show a mechanical process for forming a lip portion in a nickel plate nozzle.
Figure 4B:
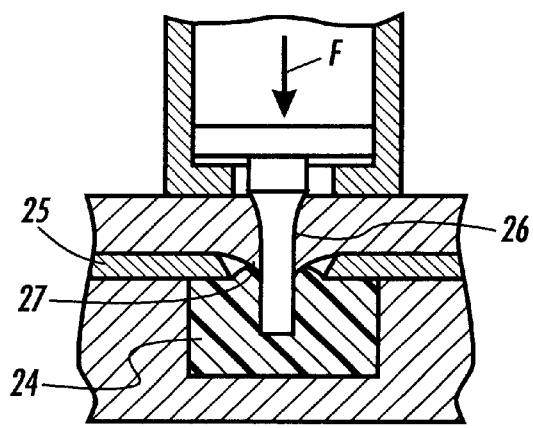
Figure 5A:
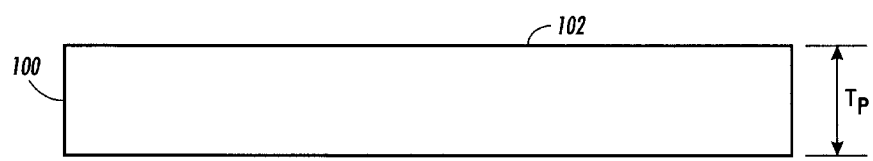
FIGS. 5A–5D show an embodiment of the present invention.

FIGS. 5A–5D show a process by which a nozzle plate 100 can be microfabricated to include an ink jet nozzle including a lip for use in an ink jet printer. The process will be described in terms of a sequential process, although the order of the steps can obviously be rearranged or performed simultaneously. In FIG. 5A, a nozzle plate 100 made from a suitable material is provided which has a thickness $T_p$. The nozzle plate can be made from any suitable material that is subject to laser ablation, such as a polymer or plastic. Laser ablation can vary depending on the material, but generally involves photonic induced ablation, which is known in the art.

Figure 5B:
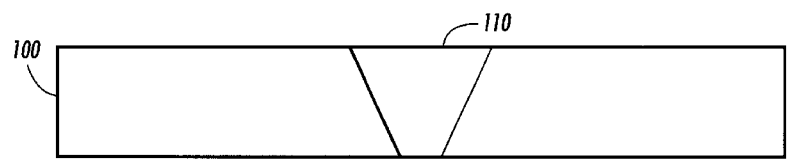
Figure 5C:
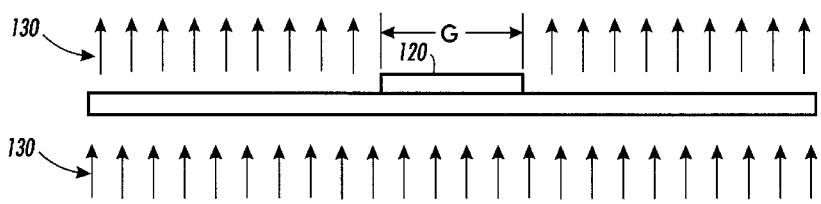
Figure 5D:
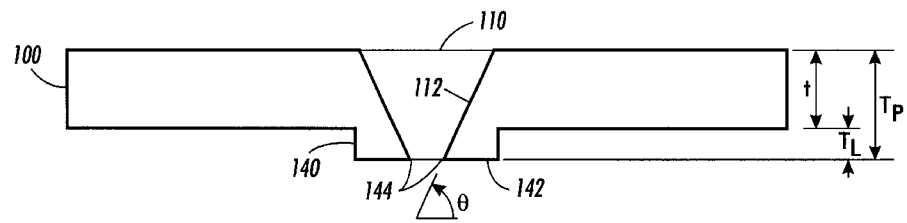
Figure 6A:
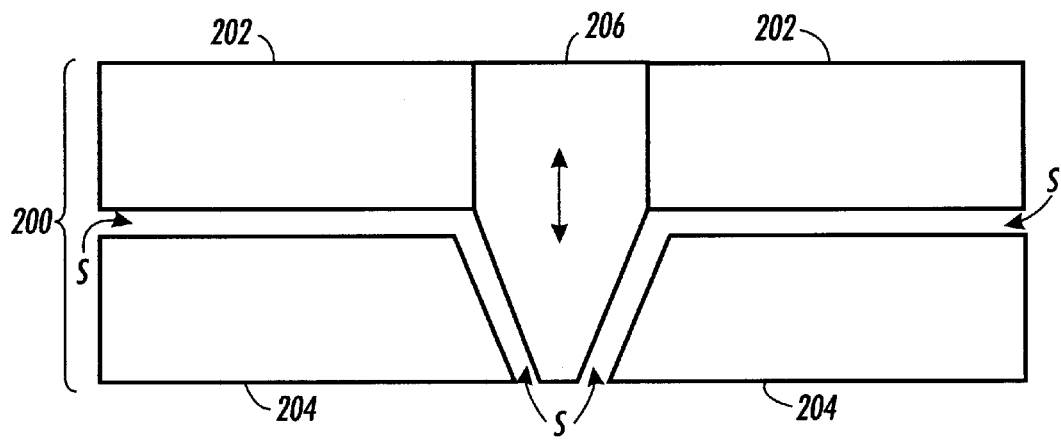
FIGS. 6A–6C show another embodiment of the present invention.
Figure 6B:
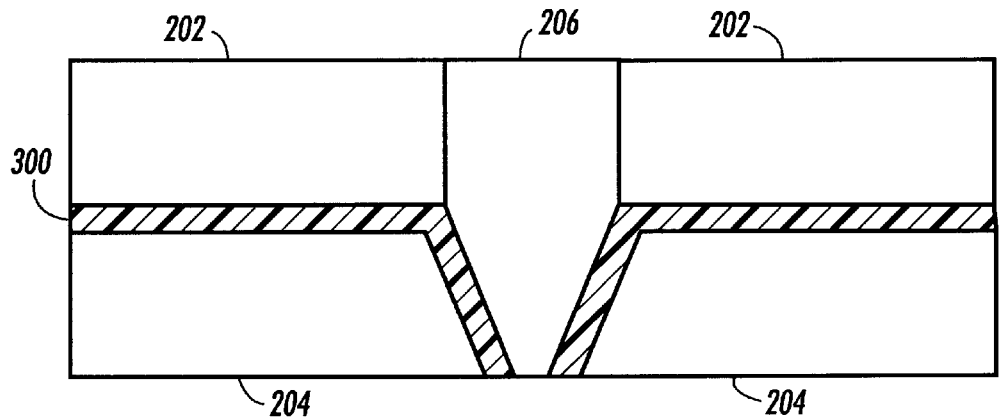
Figure 6C:
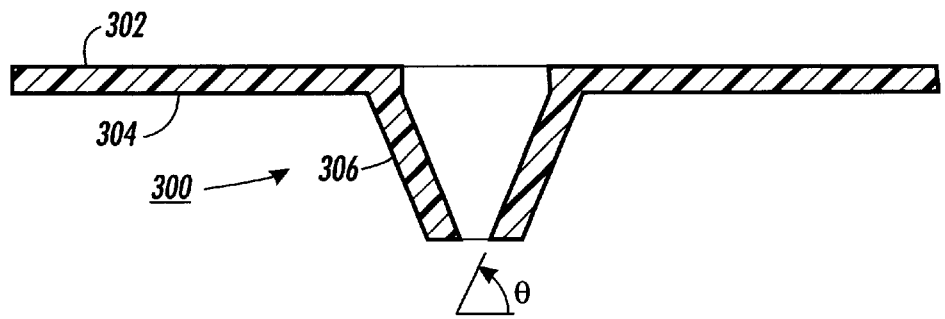

The nozzle plate 100 in FIG. 5A is subjected to laser ablation from an upper surface 102 thereof to produce an ink jet orifice or bore 110. As shown in FIG. 5B, the ink jet bore 110 extends completely through the nozzle plate 100 from the upper surface 102 thereof to a lower surface 104 thereof. The nozzle plate 100 shown in FIG. 5B is provided with an optional photomask 120 commonly known in the art which is adjacent to the lower surface 104 and over the bore 110. After the photomask is properly placed, laser ablation is performed on the lower surface 104 of the nozzle plate 100. A series of arrows 130 represent the laser ablation process. The photomask 120 provides a gap G over which the laser ablation does not effect the lower surface 104 of the nozzle plate 100. As a result of the laser ablation of the lower surface 104, the nozzle plate 100 is ablated such that the thickness thereof is reduced to an amount t. This reduced thickness amount t is shown in FIG. 5D. The difference between the original thickness $T_p$ of the nozzle plate 100 shown in FIG. 5A and the thickness t shown in FIG. 5D represents the thickness $T_L$ of a lip 140 which is shown in FIG. 5D. As shown in FIG. 5D, the bore extends from the upper surface 102 to the lower surface 104 of the nozzle plate 100 and completely through the lip 140. Also, the bore has an interior surface 112 inclined at an angle with respect to the upper and lower surfaces 102 and 104, and the angle is substantially constant throughout the thickness of the nozzle plate 100 and the lip 140. Using the laser ablation microfabrication technique, it is possible to create a nozzle plate 100 including a lip 140 formed in one piece therewith which can prevent asymmetrical depositing of ink about the regions surrounding the bore 110 of the ink jet nozzle. In addition, because the ink jet nozzle according to FIGS. 5A–5D is made from, e.g., a polymer, i.e., a material other than a silicon wafer or a semiconductor, problems associated with ink latitude limitations and ink history defects can be avoided. In other words, the laser ablation technique allows the use of materials that are resistant to damage by ink. The materials allow increased ink latitude (i.e., more chemically aggressive inks can be used, such as inks which are acidic (pH=3) or basic (pH=9–10). Such caustic inks can etch/dissolve nozzle materials such as silicon. However, materials such as Teflon® can be very chemically inert, so a nozzle plate made from this material can be resistant to ink damage.

Also, because a lower surface 142 of the lip 140 forms an angle θ with the interior bore 112 which is acute, a sharp point 144 is created which serves to assist in controlling ink wetting of the lower surface 142.

Another embodiment of the invention will be described with reference to FIGS. 6A–6C, which show a process for producing an ink jet nozzle according to the present invention. FIG. 6A shows a precision injection molding unit 200 which includes an upper mold 202 and a lower mold 204. Formed as part of the upper mold 202 is a nozzle forming pin

206. The nozzle forming pin 206 may be movable relative to the upper mold 202 as indicated by the arrow, the purpose of which will be explained below.

Once the proper positioning of the upper and lower molds 202 and 204 is achieved, and the nozzle forming pin 206 is in place, a molding material is inserted into a gap or space S which is created between the upper and lower molds and between the nozzle forming pin 206 and the lower mold 204. The molding material can be made of any suitable injection molding material, such as plastics, polymers (e.g., polysulphone) or ceramics. FIG. 6B shows the molding material 300 after it has been injected into the molding unit 200.

Once the molding material 300 has been set, the upper and lower molds as well as the nozzle forming pin 206 are removed to release the thus formed ink jet nozzle 300. The ink jet nozzle 300 includes a nozzle plate 302 having a lower surface 304. A lip 306 is formed in one piece with the nozzle plate 302 and extends away from the lower surface 304 of the nozzle plate 302. The ink jet nozzle according to this embodiment has advantages which are similar to those discussed above in relation to the embodiment of FIGS. 5A–5D.

Preferred embodiments of the invention have been described with reference to examples which are intended to be illustrative rather than limiting. Various changes and modifications may be made without departing from the spirit and scope of the disclosure.

What is claimed is:

1. A method of microfabrication of an ink jet nozzle comprising the steps of:

providing a nozzle plate having an upper surface and a lower surface;

laser ablating the upper surface of the nozzle plate to create a bore which extends from the upper surface of the nozzle plate to the lower surface of the nozzle plate; and laser ablating the lower surface of the nozzle plate to create a lip which extends away from the lower surface of the nozzle plate.

2. The method of claim 1, further comprising placing a photomask adjacent the lower surface and over the bore before laser ablating the lower surface.

3. The method of claim 1, wherein the nozzle plate comprises a material resistant to ink.

4. The method of claim 1, wherein a thickness of the lip is substantially equal to a thickness by which the nozzle plate is reduced during laser ablation of the lower surface thereof.

5. An ink jet nozzle made according to the method of claim 1.

6. An ink printer including the ink jet nozzle of claim 5.

* * * * *